United States Patent Office 2,815,382
Patented Dec. 3, 1957

2,815,382

ALKYL-SUBSTITUTED TETRAHYDRONAPH-THINDANONES

Marion S. Carpenter, Nutley, William M. Easter, Jr., Hasbrouck Heights, and Thomas F. Wood, Little Falls, N. J., assignors to The Givaudan Corporation, New York, N. Y., a corporation of New Jersey No Drawing. Application May 10, 1955,
Serial No. 507,505

6 Claims. (Cl. 260—590)

This invention relates to novel chemical compounds and more especially to alkyl-substituted tetrahydronaphthindanones having musk-like odors.

Most of the known synthetic musk-like compounds fall into two classes: (1) nitrated aromatic hydrocarbons, such as musk xylene, and (2) macrocyclic ketones, lactones or esters such as cyclopentadecanone, cyclopentadecanolide and ethylene brassylate. While members in the first group are inexpensive to manufacture, they suffer from the disadvantage that they are not light-stable or alkali-stable, frequently causing discoloration in products such as soap. Members of the second group, while reasonably stable to light and alkali, are difficult to manufacture and are relatively costly.

We have found that alkyl-substituted tetrahydronaphthindanones possess musk-like odors, are light-stable and alkali-stable and are relatively inexpensive to manufacture.

In general, our novel musk-like compounds are prepared in three steps: (1) preparation of suitable alkyl-substituted tetrahydronaphthalenes, (2) condensation of the latter with $\beta$-chloropropionyl chloride to the corresponding $\beta$-chloroethyl ketones and (3) cyclization of the latter with elimination of hydrogen chloride to produce the desired alkyl-substituted tetrahydronaphthindanones.

Examples of specific compounds we have prepared include 4,6,6,9-tetramethyl 6,7,8,9-tetrahydro $\alpha$-naphthindan-3-one, 5,5,8,8-tetramethyl 5,6,7,8-tetrahydro $\beta$-naphthindan-1-one, 4,6,6,9,9-pentamethyl 6,7,8,9-tetrahydro $\alpha$-naphthindan-3-one, 4-ethyl 6,6,9,9-tetramethyl 6,7,8,9-tetrahydro $\alpha$-naphthindan-3-one, and 4-isopropyl-6,6,9,9-tetramethyl 6,7,8,9-tetrahydro $\alpha$-naphthindan-3-one.

The following examples are given in order more fully to illustrate the invention without, however, limiting the same to them.

EXAMPLE 1

*Preparation of 4,6,6,9-tetramethyl 6,7,8,9-tetrahydro $\alpha$-naphthindan-3-one*

An ether solution of 142 g. of 5-p-tolyl hexan-2-one was added with agitation to an ether solution of methyl magnesium iodide prepared from 116 g. of methyl iodide and 20 g. of magnesium shavings. The reaction mixture was quenched on iced dilute hydrochloric acid and the ether solution was washed to neutrality and distilled to yield 141 g. of 2-methyl 5-p-tolyl hexan-2-ol as a colorless oil boiling at 102° C./1 mm. Hg and having Sp. Gr. (25° C.) 0.9466 and $n_D^{20}$ 1.5155.

To 260 g. of 93% sulfuric acid previously cooled to 0° C. there was added with agitation during 40 minutes 140 g. of 2-methyl 5-p-tolyl hexan-2-ol, maintaining the temperature at 0° C. by cooling. The reaction mixture was quenched on ice and the oil layer was separated, washed to neutrality and distilled to yield 113 g. of 1,1,4,7-tetramethyl 1,2,3,4-tetrahydronaphthalene as a colorless oil boiling at 86° C./2 mm. Hg and having Sp. Gr. (25° C.) 0.9410 and $n_D^{20}$ 1.5300.

A solution of 56.4 g. of 1,1,4,7-tetramethyl 1,2,3,4-tetrahydronaphthalene and 40.5 g. of $\beta$-chloropropionyl chloride was added with agitation to a suspension of 48 g. of anhydrous aluminum chloride in 250 g. of ethylene dichloride, keeping the temperature at 25–30° C. When hydrogen chloride evolution had ceased the reaction mixture was quenched on ice and the ethylene dichloride solution was washed to neutrality and the solvent was evaporated, leaving 81 g. of crude $\beta$-chloroethyl 1,1,4,7-tetramethyl 1,2,3,4-tetrahydronaphthyl-6-ketone as a dark colored oil. The latter was added to 1,200 g. of 93% sulfuric acid and the mixture was agitated while heating to 70° C. When hydrogen chloride evolution had subsided the reaction mixture was quenched on ice, extracted with benzene and the benzene solution was washed to neutrality and the solvent was evaporated, leaving 60 g. of oil. After crystallization from alcohol there was obtained 10 g. of 4,6,6,9-tetramethyl 6,7,8,9-tetrahydro $\alpha$-naphthindan-3-one as practically colorless crystals melting at 153–154° C. and having a musk-like odor.

EXAMPLE 2

*Preparation of 5,5,8,8-tetramethyl 5,6,7,8-tetrahydro $\beta$-naphthindan-1-one*

A solution of 37.6 g. of 1,1,4,4-tetramethyl 1,2,3,4-tetrahydronaphthalene and 27 g. of $\beta$-chloropropionyl chloride was added with agitation to a suspension of 32 g. of anhydrous aluminum chloride in 200 g. of ethylene dichloride, keeping the temperature at 25–30° C. When hydrogen chloride evolution had ceased the reaction mixture was quenched on ice and the ethylene dichloride solution was washed to neutrality and the solvent was evaporated, leaving 54 g. of crude $\beta$-chloroethyl 1,1,4,4-tetramethyl 1,2,3,4-tetrahydronaphthyl-6 ketone as a dark-colored oil. The latter was added to 800 g. of 93% sulfuric acid and the mixture was agitated while heating to 80° C. When hydrogen chloride evolution had subsided the reaction mixture was quenched on ice, extracted with benzene and the benzene solution was washed to neutrality and the solvent was evaporated, leaving 40 g. of crude crystalline material. After crystallization from alcohol there was obtained 15 g. of 5,5,8,8-tetramethyl 5,6,7,8-tetrahydro $\beta$-naphthindan-1-one as practically colorless crystals melting at about 140° C. and having a musk-like odor.

EXAMPLE 3

*Preparation of 4,6,6,9,9-pentamethyl 6,7,8,9-tetrahydro $\alpha$-naphthindan-3-one*

A solution of 40.5 g. of 1,1,4,4,6-pentamethyl 1,2,3,4-tetrahydronaphthalene and 27 g. of $\beta$-chloropropionyl chloride was added with agitation to a suspension of 32 g. of anhydrous aluminum chloride in 200 g. of ethylene dichloride, keeping the temperature at 25–30° C. When hydrogen chloride evolution had ceased the reaction mixture was quenched on ice and the ethylene dichloride solution was washed to neutrality and the solvent was evaporated, leaving 58 g. of crude $\beta$-chloroethyl 1,1,4,4,6-pentamethyl 1,2,3,4-tetrahydronaphthyl-7 ketone as a brown-colored oil. The latter was added to 865 g. of 93% sulfuric acid and the mixture was agitated while heating to 80° C. When hydrogen chloride evolution had subsided the reaction mixture was quenched on ice, extracted with benzene and the benzene solution was washed to neutrality and the solvent was evaporated, leaving 38 g. of crude crystalline material. After crystallization from alcohol there was obtained 26 g. of 4,6,6,9,9-pentamethyl 6,7,8,9-tetrahydro $\alpha$-naphthindan-3-one as practically colorless crystals melting at 116–117° C. and having a musk-like odor.

EXAMPLE 4

*Preparation of 4-ethyl 6,6,9,9-tetramethyl 6,7,8,9-tetrahydro α-naphthindan-3-one*

A solution of 183 g. of 2,5-dichloro 2,5-dimethyl hexane in 249 g. of ethyl benzene was added with agitation during one hour to a mixture of 6 g. of anhydrous ferric chloride and 279 g. of ethyl benzene, keeping the temperature at 0° C. to 5° C., by cooling. When hydrogen chloride evolution had ceased the reaction mixture was quenched in water, the ethyl benzene solution was washed to neutrality and distilled. There was obtained, in addition to the excess of ethyl benzene, 205 g. of 1,1,4,4-tetramethyl 6-ethyl 1,2,3,4-tetrahydronaphthalene as a colorless oil boiling at 88–89° C./1.5 mm. Hg.

A solution of 43.2 g. of 1,1,4,4-tetramethyl 6-ethyl 1,2,3,4-tetrahydronaphthalene and 27 g. of β-chloropropionyl chloride was added with agitation to a suspension of 32 g. of anhydrous aluminum chloride in 200 g. of ethylene dichloride, keeping the temperature at 25–30° C. When hydrogen chloride evolution had ceased the reaction mixture was quenched on ice and the ethylene dichloride solution was washed to neutrality and the solvent was evaporated, leaving 61 g. of crude β-chloroethyl 1,1,4,4-tetramethyl 6-ethyl 1,2,3,4-tetrahydronaphthyl-7 ketone as a brown-colored oil. The latter was added to 900 g. of 93% sulfuric acid and the mixture was agitated while heating to 80° C. When hydrogen chloride evolution had subsided the reaction mixture was quenched on ice, extracted with benzene, the benzene solution was washed to neutrality and the solvent was evaporated, leaving 40 g. of crude crystalline material. After crystallization from alcohol there was obtained 22 g. of 4-ethyl 6,6,9,9-tetramethyl 6,7,8,9-tetrahydro α-naphthindan-3-one as colorless crystals melting at 64–65° C. and having a musk-like odor.

EXAMPLE 5

*Preparation of 4-isopropyl 6,6,9,9-tetramethyl 6,7,8,9-tetrahydro α-naphthindan-3-one*

A mixture of 200 grams of cumene and 10 grams of anhydrous ferric chloride was cooled to 10° C. and to it was added a solution of 366 grams of 2,5-dichloro 2,5-dimethylhexane in 520 grams of cumene during 1 hour, keeping the temperature at 10–15° C. and agitating continuously. After the evolution of hydrogen chloride had ceased the solution was quenched in water, washed to neutrality and distilled to yield, in addition to 408 grams of recovered cumene, 392 grams of a colorless, practically odorless oil boiling at 94–95° C./1 mm. Hg which congealed upon cooling and melted at 28° C., and which is 1,1,4,4-tetramethyl 6-isopropyl 1,2,3,4-tetrahydronaphthalene.

A solution of 85 grams of 1,1,4,4-tetramethyl 6-isopropyl 1,2,3,4-tetrahydronaphthalene and 50 grams of β-chloropropionyl chloride was added with agitation to a suspension of 60 grams of anhydrous aluminum chloride in 400 grams of ethylene dichloride, keeping the temperature at 25–30° C. When hydrogen chloride evolution had ceased the reaction mixture was quenched on ice and the ethylene dichloride solution was washed to neutrality and the solvent was evaporated, leaving 115 grams of crude β-chloroethyl 1,1,4,4-tetramethyl 6-isopropyl 1,2,3,4-tetrahydronaphthyl-7 ketone as a brown colored oil. The latter was added to 1,684 grams of 93% sulfuric acid and the mixture was agitated while heating to 55° C. When hydrogen chloride evolution had subsided the reaction mixture was quenched on ice, extracted with benzene, the benzene solution was washed to neutrality and the solvent was evaporated leaving 77 grams of crude crystalline material. After crystallization from alcohol there was obtained 37 grams of 4-isopropyl 6,6,9,9-tetramethyl 6,7,8,9-tetrahydro α-naphthindan-3-one as colorless crystals melting at 88.5–90.5° C. and having a musk-like odor.

The foregoing illustrates the practice of the invention, which however is to be construed as broadly as permissible in view of the prior art and limited solely by the appended claims.

We claim:

1. Alkyl-substituted tetrahydronaphthindanones selected from the group consisting of tetrahydronaphthindan-1-ones and tetrahydronaphthindan-3-ones having lower alkyl substituents in the tetrahydronaphthalene portion so as to yield at least one quaternary carbon atom in said portion.

2. 4,6,6,9 - tetramethyl - 6,7,8,9 - tetrahydro - α - naphthindan-3-one.

3. 5,5,8,8 - tetramethyl - 5,6,7,8 - tetrahydro - β - naphthindan-1-one.

4. 4,6,6,9,9 - pentamethyl - 6,7,8,9 - tetrahydro - α-naphthindan-3-one.

5. 4 - ethyl - 6,6,9,9 - tetramethyl - 6,7,8,9 - tetrahydro-α-naphthindan-3-one.

6. 4 - isopropyl - 6,6,9,9 - tetramethyl - 6,7,8,9 - tetrahydro-α-naphthindan-3-one.

References Cited in the file of this patent

UNITED STATES PATENTS 1,754,031  Mayer et al. _____ Apr. 8, 1930

OTHER REFERENCES

Cauquil et al.: Chem. Abstracts, vol. 41, page 1649 (1947).

Arnold et al.: J. Am. Chem. Soc., vol. 68, pgs. 2176–8 (1946).